United States Patent [19]

Shorey

[11] 4,186,901
[45] Feb. 5, 1980

[54] CARGO RAMP HOIST MECHANISM
[75] Inventor: Thomas H. Shorey, Freeland, Wash.
[73] Assignee: The Boeing Company, Seattle, Wash.
[21] Appl. No.: 873,668
[22] Filed: Jan. 30, 1978
[51] Int. Cl.² .................. B64D 9/00; B60P 1/00; B60P 1/48
[52] U.S. Cl. .................. 244/137 R; 14/71.3; 414/537
[58] Field of Search ............... 214/85, 85.1; 244/137 R, 137 P, DIG. 2; 14/71.3, 69.5, 71.1

[56] References Cited
U.S. PATENT DOCUMENTS

| | | | |
|---|---|---|---|
| 2,691,451 | 10/1954 | Westfall | 214/85.1 X |
| 3,002,719 | 10/1961 | Weiland | 214/85 X |

Primary Examiner—Albert J. Makay
Assistant Examiner—Edmond G. Rishell, Jr.
Attorney, Agent, or Firm—Christensen, O'Connor, Johnson & Kindness

[57] ABSTRACT

A portable hoist mechanism which is configured for temporary installation proximate the cargo opening of an aircraft to facilitate the loading and unloading of a cargo ramp is disclosed. The hoist mechanism includes a rectangular base unit that is placed on the floor of the aircraft cargo compartment and structurally interconnected with the aircraft sill fittings and end locks of the aircraft cargo handling system. An A-frame, having a cable sheave mounted at the apex thereof, is pivotably attached to the forward portion of the base unit upper surface in an orientation which permits the upper end of the A-Frame to be swung outwardly through the aircraft cargo opening. A ball screw actuator, extending angularly from the central region of the A-frame to the rear portion of the base unit upper surface, is operable to selectively position the A-frame during loading and unloading of a cargo ramp. In operation, the first end of a cable assembly is threaded through the A-frame cable sheave and connected to a winch of the aircraft cargo handling system. A bridle, at the second end of the cable assembly, is interconnected with the upper end of the cargo ramp and the cargo system winch and ball screw are operated to raise or lower the upper end of the cargo ramp between ground level and guide channels that are mounted on the floor of the cargo compartment for receiving the cargo ramp. During this operation, the ball screw is utilized to swing the A-frame so that the upper end of the cargo ramp does not strike the aircraft and the cargo system winch is utilized to raise and lower the upper end of the cargo ramp between the ground and the sill region and to move the upper end of the cargo ramp into or out of the guide channels.

7 Claims, 8 Drawing Figures

CARGO RAMP HOIST MECHANISM

BACKGROUND OF THE INVENTION

This invention relates to aircraft cargo handling systems and more particularly to apparatus for rapid installation of a cargo ramp of the type which is deployed between an aircraft cargo opening and the ground to facilitate the loading and unloading of vehicles, pallatized cargo and other cargo of a general nature.

Large cargo carrying aircraft often utilize an inclined ramp structure that is extendable between the sill region of the aircraft cargo opening and the ground to facilitate loading and unloading of the aircraft. One such cargo ramp, which can be carried onboard an aircraft and easily deployed through a cargo opening formed by an upwardly swingable nose section of the aircraft, is disclosed in U.S. Pat. No. 4,039,163, such patent having issued to the Applicant named herein and being assigned to the assignee of this application.

Although each embodiment of the cargo ramp disclosed and claimed in the aforementioned patent, is specifically arranged for storage within the aircraft cargo compartment and is arranged for structural coaction with components of the aircraft cargo system to provide rapid deployment between the aircraft cargo opening and the ground, it is sometimes necessary or desirable to remove such a cargo ramp from the aircraft or load such a cargo ramp onto an aircraft. Such loading and unloading operations must be undertaken, for example, if a cargo ramp is to be replaced or removed for repair and maintenance operations. Further, in operating a sizable fleet of cargo aircraft, it could be advantageous to operate with a number of cargo ramps that is less than the number of aircraft being operated. In this regard, a cargo ramp could be installed and carried aboard an aircraft during flights in which a cargo ramp or other cargo loading system is not available at the aircraft's destination. On the other hand, when a cargo ramp is available at the aircraft's destination, the cargo ramp utilized for loading the aircraft could be disconnected and left at the point of departure with another cargo ramp being installed to the aircraft for the unloading operation.

It will be recognized that the potential benefits of such a procedure include minimizing the investment required to maintain an adequate cargo handling system and, since a cargo ramp need not be carried on all flights, an increase in the cargo carrying capacity of the aircraft or, if the increased capacity is not utilized, a decrease in the gross weight of the aircraft. However, these potential advantages can only be realized if equipment is available to rapidly install the cargo ramp to the aircraft and to rapidly disconnect the cargo ramp whenever the ramp will not be required at the aircraft's destination. In particular, in both commercial and military applications, efficient utilization of the aircraft demands that cargo be loaded and unloaded as quickly as possible. Further, in military applications in which cargo is loaded or unloaded under conditions in which the aircraft may be exposed to enemy action, it is highly desirable to minimize the amount of time that the aircraft is on the ground.

Since cargo ramps such as those described in the above-referenced patent extend from the cargo opening sill region, which is located a considerable distance above ground level, and since such cargo ramps are constructed to bear the weight of heavy cargo such as vehicles, the cargo ramps are both quite bulky and heavy. Thus, conventional ground support equipment is generally not satisfactory for rapidly moving the upper end of a cargo ramp into and out of engagement with the aircraft. Further, attempts to utilize conventional apparatus could easily result in damage to the aircraft if the upper end of the cargo ramp were accidently allowed to strike the aircraft sill region during such operations.

Although special ground support equipment could be designed to effect satisfactory operation, such equipment would appear to present several disadvantages and drawbacks. For example, because of the relatively high sill height of the aircraft cargo opening and the weight of the cargo ramp, such ground support equipment would necessarily be rather massive or, in the alternative, require extendable stabilizers to allow the equipment to lift the upper end of the cargo ramp into and out of position. Further, such ground support equipment would generally not only require power driven apparatus for lifting a cargo ramp, but would also require a propulsion system so that the equipment could be moved about between various aircraft.

SUMMARY OF THE INVENTION

It is an object of this invention to eliminate the problems and high costs attendant such ground support equipment by providing apparatus for loading and unloading a cargo ramp which is portable, relatively small in size and lightweight so that such apparatus can either be carried aboard the aircraft, stored with the cargo ramps, or rapidly brought to an aircraft when required.

Further, it is an object of this invention to provide portable apparatus of the above-described type that is configured for both rapid setup or installation and for expeditiously moving the upper end of a cargo ramp into or out of engagement with the aircraft.

Even further, it is an object of this invention to provide apparatus of the above-described type which exhibits ease of operation and is amenable to economic production and operation.

These and other objects are achieved in accordance with this invention by a portable hoist mechanism that is arranged for temporary installation to the floor of the aircraft at a position proximate to the cargo opening sill region. In accordance with the invention, the hoist mechanism includes a base unit that is anchored to the cargo compartment floor by restraints that are interconnected with sill fittings, which are utilized to lock the cargo opening in a closed position, and with end locks that extend upwardly from the floor of the aircraft cargo compartment. An A-frame assembly is pivotably attached to the base unit in an orientation which permits the apex of the A-frame to swing through the aircraft cargo opening. A linear actuator, which is operable to maintain the A-frame in a desired position, extends angularly downward from the central region of the A-frame to the base unit.

To hoist a cargo ramp into position for engagement with the aircraft, the linear actuator is operated to swing the A-frame apex outwardly through the cargo opening such that it is positioned directly above the end of the cargo ramp that is to be engaged with the aircraft. A cable assembly, which extends through a cable sheave located at the apex of the A-frame, is interconnected with the end of the cargo ramp and the end of the ramp is pulled upwardly by a winch of the type conventionally supplied as a component of the aircraft's onboard cargo handling system. When the end of the cargo ramp has cleared the aircraft and is positioned outwardly from and above the sill of the cargo opening, the linear actuator is operated to swing the end of the cargo ramp through the cargo opening. When the end of the cargo ramp is positioned directly above guide channels which are included in aircraft utilizing cargo ramps of the type described in the previously referenced U.S. Pat. No. 4,039,163, the winch is operated to lower the upper end of the cargo ramp into place. The hoist mechanism is then disconnected from the aircraft for later utilization in removing the cargo ramp after the aircraft has been loaded or unloaded. Such removal of the cargo ramp being effected by reversing the steps of the cargo ramp loading sequence. Alternatively, if the cargo ramp is to be carried onboard the aircraft, the hoist mechanism is either stowed with the cargo ramp or returned to ground storage facilities.

In the disclosed embodiments of the invention, the base unit is substantially rectangular in geometry and is of dimensions similar to those of conventional cargo handling pallets. Thus, the invention can be easily moved through the aircraft by conventional cargo handling equipment such as a roller system that is commonly installed in the floor of the cargo compartment. Further, to provide a convenient storage configuration, the base unit of the disclosed embodiments comprises three hinged together rectangular panels and the A-frame can be disconnected from the base unit and from the linear actuator. With the A-frame disconnected, the outer panels of the base unit can be swung upwardly with the A-frame, linear actuator and cable assembly being placed atop the central panel of the base unit and between the upwardly extending outer panels. This configuration is especially advantageous in situations in which the hoist mechanism of this invention is to be stored with a cargo ramp of the type disclosed in the previously referenced patent since the partially disassembled and folded hoist can be accomodated within a well region that extends longitudinally along the central portion of such a cargo ramp.

In each embodiment of the invention that is disclosed herein, the restraints which anchor the hoist mechanism to the floor of the aircraft include a set of substantially U-shaped fittings pivotably mounted to extend from the rear portion of the base unit and a set of flexible straps or webs that extend from the forward edge of the base unit. Each of the U-shaped fittings is mounted to be adjacent to an L-shaped end lock that projects upwardly and rearwardly from the floor of the cargo compartment and the forwardly extending straps are arranged for placement over the cargo opening sill in alignment with each of the aircraft sill fittings. To lock the hoist in position, the base unit is placed on the floor of the aircraft and slid rearwardly into abutment with the L-shaped end stops. The U-shaped straps are then swung downwardly to encompass the end locks and a fitting at the outer end of each flexible strap is engaged with one of the aircraft sill fittings. Strap tighteners, mounted to the upper surface of the base unit and encompassing each of the flexible straps, are then operated to place the base unit under tensional force to thereby clamp the hoist mechanism to the floor of the aircraft.

BRIEF DESCRIPTION OF THE DRAWING

Other objects and advantages of the present invention will be apparent to one skilled in the art after reading of the following description taken together with the accompanying drawing in which.

DETAILED DESCRIPTION

Figures 1, 7:
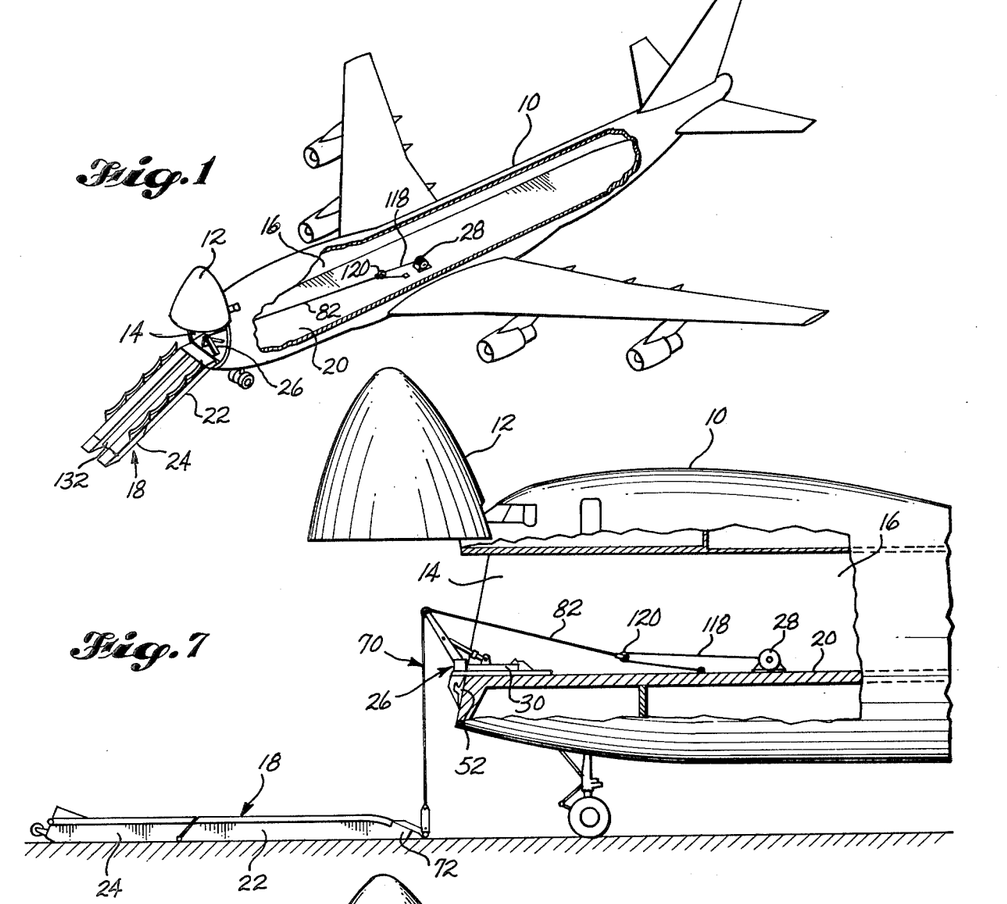
FIG. 1 is an isometric view of an aircraft equipped with a cargo ramp and having a hoist mechanism that is constructed in accordance with this invention installed at the sill region of the aircraft cargo opening.
FIG. 7 is a side elevation view which depicts the orientation of the aircraft, cargo ramp and ramp hoist of this invention at the beginning of the operational sequence in which a cargo ramp is raised into engagement with the aircraft and at the end of the operational sequence in which a cargo ramp is lowered from engagement with the aircraft.

FIG. 1 depicts an aircraft 10 having an upwardly swingable nose section 12 that is openable to define a cargo opening 14 which permits access to the aircraft cargo compartment 16. A cargo ramp 18 extends angularly downward between the sill of the cargo opening 14 and the surface of the ground to provide an inclined plane permitting cargo to be removed from or placed onboard the aircraft 10.

The cargo ramp 18 of FIG. 1 is configured and arranged as is described in U.S. Pat. No. 4,039,163, which issued to the inventor of the present apparatus and which is assigned to the assignee of this application. As is fully described in the aforementioned patent, the cargo ramp 18 is configured for stowage within the cargo compartment 16 during periods of nonuse and is arranged for ease of deployment from the aircraft. In this respect, such a cargo ramp 18 includes two or more hinged-together ramp sections (22 and 24 in the figures) and actuators (not shown in the figures) for swinging the ramp sections about one another during portions of the ramp deployment storage sequence. A complete understanding of the construction and operation of such a cargo ramp 18 can be had by a reading of the aforementioned U.S. Pat. No. 4,039,163. Thus, although features of the cargo ramp 18 that are most pertinent to the construction and operation of this invention are briefly described herein, such details as are required for a more complete understanding of the cargo ramp 18 and its relationship to this invention are hereby incorporated by reference to the above-identified U.S. patent. In this respect, it suffices to initially recognize that the cargo ramp 18 is constructed to engage with the sill region of the cargo opening 14 when the ramp is deployed as depicted in FIG. 1 and to realize that, since the cargo ramp 18 is structured to bear the weight of heavy cargo such as relatively large vehicles (e.g., trucks and military equipment), the cargo ramp 18 is relatively heavy and is of considerable size. Because the cargo ramp 18 is specifically structured and arranged to be easily moved from a stowed position within the cargo compartment 16 and the deployed position of FIG. 1, such size and weight does not present a significant drawback as long as the cargo ramp 18 remains aboard the aircraft 10.

It can be recognized however that the versatility of such an aircraft-cargo ramp configuration can be increased if provision is made for rapidly removing the cargo ramp 18 from the aircraft 10 and for rapidly installing such a cargo ramp. In this regard, the cargo ramp 18 of a particular aircraft could be removed after cargo had been loaded into or unloaded from the aircraft and left on the ground for use by aircraft arriving at a later time. Thus, operation of a fleet of such aircraft could require fewer cargo ramps than the number of aircraft being operated and it would be only necessary to carry the cargo ramp 18 aboard the aircraft 10 whenever a cargo ramp or other suitable cargo handling facilities were not available at the aircraft's destination. Such a method of operation further increases the overall efficiency of the aircraft's operation in that additional cargo space becomes available when the cargo ramp 18 is not carried aboard the aircraft 10 and, if such space is not occupied by cargo, fuel savings result.

With continued reference to FIG. 1, this invention provides a portable cargo ramp hoist (generally denoted by the numeral 26) that is temporarily affixed to the cargo compartment floor 20 adjacent to the sill region of the cargo opening 14. As shall be described in more detail hereinafter, the hoist 26 is configured for interconnection with conventional components of the aircraft 10 and for operation with a winch 28 which is included in the cargo handling system of such an aircraft. Further, the hoist 26 is arranged such that the upper end of the cargo ramp 18 can be raised and lowered between ground level and a position that is spaced outwardly of the cargo opening 14 without striking the aircraft 10, can be swung between this outwardly spaced position and a second position that is directly above guide channels (not shown in FIG. 1) which receive the upper end of the cargo ramp 18 during portions of the ramp deployment sequence described in the previously referenced patent, and raised and lowered between this second position and a position in which the cargo ramp 18 engages the guide channels.

Figure 2:
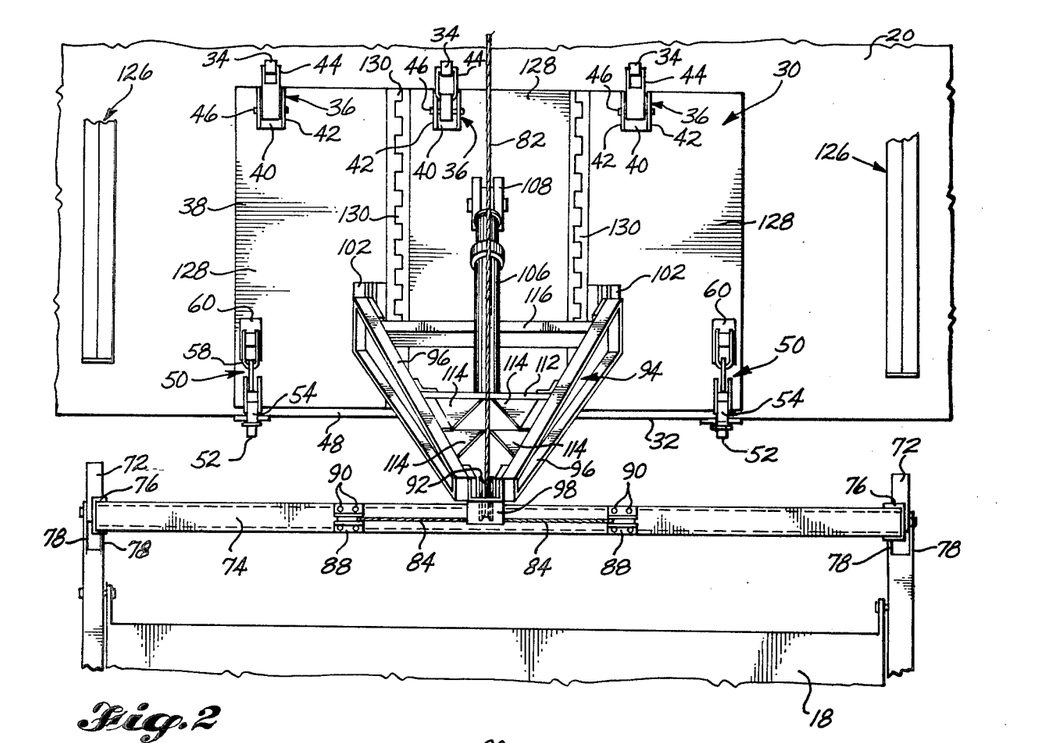
FIG. 2 is a plan view of the hoist mechanism depicted in FIG. 1.
Figure 3:
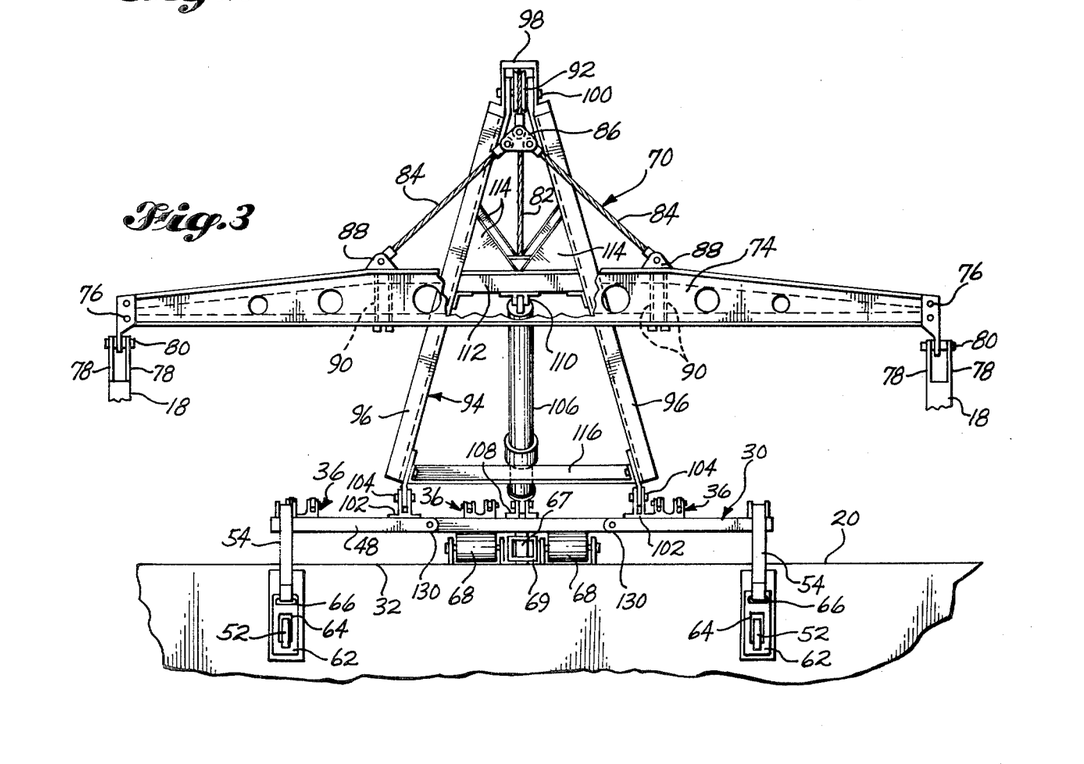
FIG. 3 is a front elevational view of the hoist mechanism of FIG. 1.
Figures 4, 5, 6:
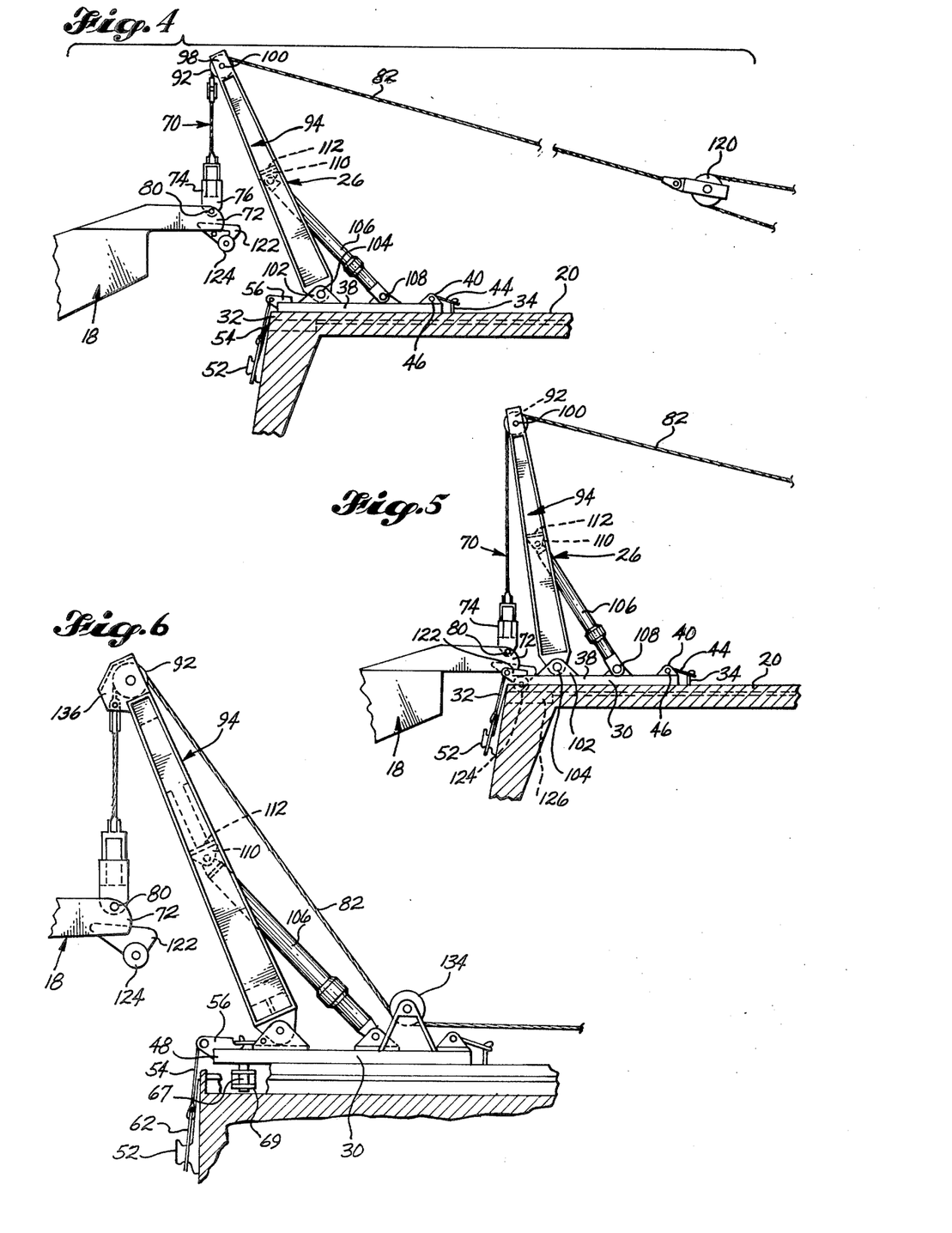
FIGS. 4 and 5 are side elevation views of the invention which respectively depict the A-frame of the hoist positioned for raising and lowering the cargo ramp between ground level and the sill region of the aircraft and positioned for raising and lowering the cargo ramp out of and into engagement with guide channels located in the floor of the aircraft cargo compartment.
FIG. 6 is a side elevation view of an other embodiment of the invention.

As is illustrated in FIGS. 2-5, the hoist 26 includes a substantially rectangular base unit 30 that is dimensioned to extent rearwardly from the cargo opening sill 32 to three spaced apart L-shaped end locks or end stops 34 that extend upwardly from the cargo compartment floor 20. Such end locks 34 are commonly provided as a portion of the aircraft handling system or, if not so provided, can be installed without interfering with normal cargo handling operations. To interconnect the base unit 30 with the end locks 34, three spaced restraints 36 are mounted to the base unit upper surface 38 at positions which place each restraint adjacent to one of the end locks 34. Each rear restraint 36 includes a bracket 40 mounted to the base unit upper surface 38 and having a pair of substantially parallel spaced apart flanges 42 which extend orthogonally upward from the base unit 30. A U-shaped strap 44, having an opening through the outer region of the parallel legs thereof, is pivotably attached between the spaced apart flanges 44 of each restraint bracket 40 by a pin 46 which passes through the opening in the strap 44 and suitably sized openings in the flanges 42. As can be seen in FIGS. 2, 4 and 5, the straps 44 are dimensioned and arranged such that each strap 44 can be swung rearwardly to encompass the upwardly extendly end stops 34. To interconnect the forward edge 48 of the base unit 30 with the aircraft 10, two forward restraints 50 are mounted to the base unit upper surface 38 at positions which place each restraint 50 directly above one of the aircraft sill fittings 52 which are utilized to lock the aircraft cargo door or swingable nose section 12 of FIG. 1 in the closed position. Each forward restraint 50 includes a flexible strap 54 such as a high strength woven nylon web and a manually operable strap tightener 56. Apparatus suitable for use as strap tighteners 56 are known in the art and are generally included as cargo tie-downs in the cargo handling system of the aircraft 10. Preferably, the strap tighteners 56 are of the rachet type such as the device identified as Air Force type CGU-1/B, or a commercial equivalent thereof. In the depicted arrangement, each strap tightener 56 is mounted to the base unit upper surface 38 by an arrangement similar to the base unit rear restraints 36. More specifically, a U-shaped strap 58 which is pivotably retained between upwardly extending spaced apart flanges of a mounting bracket 60, passes through an opening in the aft region of each strap tightener 56.

As is best illustrated by FIGS. 3, 4 and 5, the outward end of each flexible strap 54 includes a substantially rectangular engagement fitting 62 having a substantially rectangular central opening 64. In particular, the end of each strap 54 is threaded through a slot 66, which extends parallel to the upper edge of the engagement fitting 62 and is joined to form a loop which permanently interconnects the straps 54 to the engagement fitting 62. As is further illustrated by FIGS. 3 through 5, when the cargo ramp hoist 26 is positioned with the forward edge 48 resting on rollers 68 of the aircraft cargo handling system and the rear restraints 36 are engaged with the end locks 34, the flexible straps 54 are draped outwardly over the cargo opening sill 32 and the engagement fittings 62 are placed over the aircraft sill fittings 52. The strap tighteners 56 are then operated to pull the base unit firmly against the rollers 68 or other structure which may be mounted on the cargo compartment floor 20 thereby effectively anchor the hoist 26 to the cargo compartment sill region 32. In the depicted arrangement, proper positioning of the base unit 30 is ensured by a pin 67 which projects downwardly from the central porton of the base unit forward edge 48 for engagement with an opening in an indexing channel 69 that is bolted or otherwise fastened to the cargo compartment floor 20.

With continued reference to FIGS. 2-5, the hoist 26 includes a cable harness 70 which is interconnected with the upper end 72 of the cargo ramp 18 by means of a spreader bar 74. The spreader bar 74 is generally cast or otherwise fabricated to exhibit an I-beam or other high strength, lightweight configuration having a length substantially identical to the width of the cargo ramp 18. Caps 76, which are mounted to each end of the spreader bar 74, define downwardly extendly flanges which are positioned for insertion between spaced apart flanges 78 that are located at the cargo ramp upper end 72. To interconnect the spreader bar 74 with the cargo ramp 18, bolts or pins 80 are installed through suitably sized openings in the cargo ramp flanges 78 and the downwardly extending flange portion of the spreader bar end caps 76.

As can best be seen in FIG. 3, the cable harness 70 is of a Y-shaped configuration and includes a relatively long length of cable 82 which is interconnected with a winch 28 of the aircraft cargo handling system (FIG. 1) and two relatively short lengths of cable 84 which form the angularly extending branches of the cable harness 70. In the depicted arrangement, the cables 84 are joined to the cable 82 by a conventional cable fitting 86 and the outer ends of the cables 84 are connected to two mounting brackets 88 that are affixed to the upper edge of the spreader bar 74 at positions equally spaced apart from the center of the spreader bar. The mounting brackets 88 can be formed in a variety of manners and affixed to the spreader bar 74 by a number of conventional fastening techniques. For example, as is depicted in FIGS. 2 and 3, the mounting brackets 88 can be formed from an extrusion that has two parallel spaced apart legs which extend orthogonally outward from the central region of a base flange with each bracket 88 being mounted to the spreader bar 74 by bolts 90 which extend downwardly through the base flange of the brackets 88 and the spreader bar 74.

To permit the cargo ramp upper end 72 to be swung through the aircraft cargo opening 14 during cargo ramp loading and unloading operations, the cable 82 passes through a cable sheave 92 that is mounted at the apex of a selectively positionable A-frame assembly 94. More specifically, the A-frame assembly 94 includes two elongate beam members 96 that extend angularly upward from the base unit 30 to a U-shaped end fitting 98 that joins the upper ends of the beam members 96 to form the apex of the A-frame assembly 94. The cable sheave 92 is positioned between the upper ends of the beam members 96 and a pin 100, which is inserted through suitably sized openings in the end fitting 98 and the ends of the beams 96, forms an axle for the cable sheath 92. To provide interconnection of the cable 82 to the winch 28 in the manner depicted in FIG. 1, the end of the cable 82 is connected to a pulley 120 (FIG. 4).

The lower end of each beam member 96 is pivotably attached to fittings 102 which are affixed to the base unit upper surface 38 and oriented so that the apex of the A-frame 94 can be swung through an arc that lies in the plane which is substantially orthogonal to and bisects base unit 30. In the depicted embodiment, the fittings 102 are similar in structure to the spreader bar cable mounts 88 and include two upwardly extending flanges that form a channel for receiving the lower end of each beam member 96. Pins 104, inserted through openings in the flanges of the fittings 102 and openings in the lower end of the beam members 96, permit the A-frame 94 to be swung about the base unit 30 in the previously mentioned manner.

To selectively position the A-frame 94, a linear actuator such as a manually operable ball screw 106 extends rearwardly and downwardly from the central region of the A-frame 94 to a mounting bracket 108 which is affixed to the base unit upper surface 38 at a position aft of the A-frame mounting fittings 102. At the upper end, the ball screw 106 is pivotally pinned to a flange 110 which extends downwardly from the central portion of a cross member 112 that is mounted between the beam members 96 to span the central region of the A-frame 94. To further strengthen the A-frame assembly 94, triangular gussets 114 are mounted to the fore and aft faces of the beam members 96 and the cross member 112 and a second cross member 116 is mounted between the lower ends of the beam members 96.

To utilize the hoist 26 in installing or removing a cargo ramp 18, the hoist 26 is installed to the aircraft 10 and the spreader bar 74 is interconnected with the upper end 72 of the cargo ramp 18 in the manner previously described herein. The end of the cable harness 70 is then interconnected with a winch of the aircraft cargo handling system. For example, in the arrangement depicted in FIG. 1, a cargo handling winch 28 is anchored to cargo system end locks such as the previously described end locks 34 that are utilized to interconnect the rear edge of the base unit 30 to the cargo compartment floor 20 and the free end of the winch cable 118 is threaded through the pulley 120 and connected to another end lock or other suitable device that is positioned forwardly of the winch 28. Alternatively, in some situations, the pulley 120 can be eliminated and the free end of the cable harness 70 can be directly connected to the winch 28.

Figure 8:
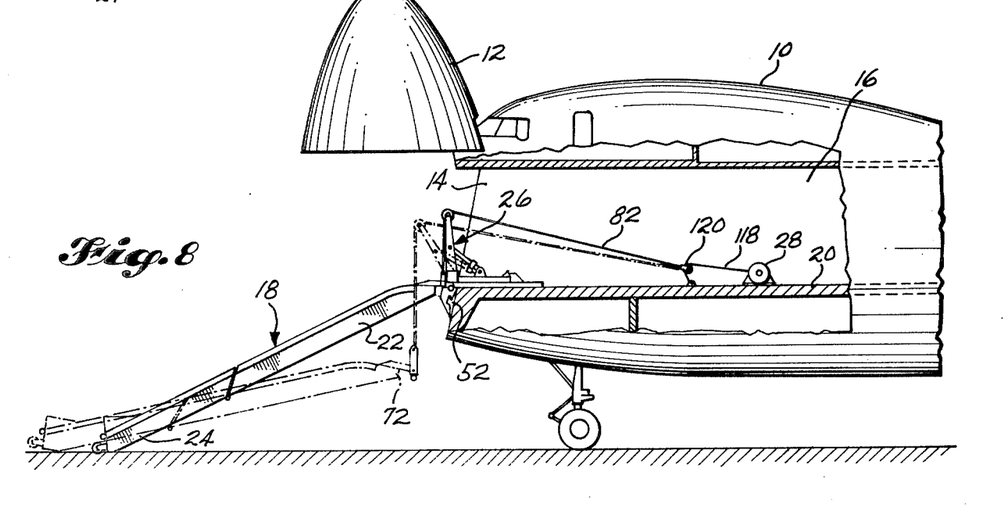
FIG. 8 is a side elevation view which depicts the orientation of the aircraft, cargo ramp and ramp hoist of this invention with the cargo ramp being illustrated fully engaged with the aircraft and at a partially raised (or lowered) position.

With reference to FIGS. 7 and 8, a cargo ramp 18 is installed to the aircraft 10 by first interconnecting the hoist 26 with the aircraft 10 and positioning the cargo ramp upper end directly below the cargo opening 14 with the cargo ramp 18 extending away from the aircraft 10. To ensure that the cargo ramp upper end 72 swings clear of the aircraft as it is hoisted up to the cargo opening 14, the ball screw 106 is operated to position the A-frame 94 and the cable sheath 92 outwardly of the cargo opening 14. As is indicated in FIG. 8, the cargo ramp upper end 72 is raised by operation of the winch 28 until the cargo ramp upper end 72 is at a position outward of and slightly above the cargo opening sill 32. With the cargo ramp 18 clear of the sill 32, the ball screw is then operated to swing the cargo ramp upper end 72 through the cargo opening 14 (as is indicated by the solid lines of FIG. 8). When the A-frame 94 is positioned such that the cargo ramp upper end 72 extends inwardly over the cargo opening sill 32, the winch 28 is operated to lower the upper end of the cargo ramp to the cargo compartment sill region. In this regard, the cargo ramps described in the previously referenced U.S. Pat. No. 4,039,163 each include retractable deployment fittings (122 in FIGS. 4 and 5) which include small rollers or wheels 124 that engage with guide channels 126 that are mounted longitudinally on the cargo compartment floor 20. With the cargo ramp deployment fittings 122 engaged with the guide channels 126, the hoist 26 is then disconnected from the aircraft 10 and the cargo ramp is engaged with the aircraft sill fittings 52 by means of the cargo ramp operational sequence fully described in the aforereferenced U.S. patent.

If the cargo ramp 18 is to be removed from the aircraft 10 upon the completion of the loading or unloading of the aircraft, the hoist 26 can usually be stowed in a convenient portion of the cargo compartment 16 by moving the hoist 26 across the roller system that is conventionally included in the cargo compartment floor 20. When needed, the hoist 26 can then be reinstalled to the aircraft 10 and operated in a reverse sequence to that described above to lower the cargo ramp 18 to the ground.

To facilitate storage of the hoist 26 for more extended periods of time, the base unit 30 of the preferred embodiments of the invention are constructed of three rectangular panels (128 in FIG. 2) which are serially interconnected by hinge straps 130. In embodiments of the invention wherein the hinges 130 are positioned between the lower ends of the A-frame beam members 96, the pins 104 which interconnect the beam members 96 to the base unit 30 and one of the pins which interconnect the ball screw 106 to the mounting bracket 108 and the cross member 112 are arranged for ready removal to permit the A-frame 94 to be disconnected from the base unit 30. With the A-frame 94 disconnected from the base 30, the base unit outer panels 128 can be swung upwardly about the hinges 130 with the A-frame 94 and the cable harness 70 being placed therebetween to thereby permit storage of the hoist 26 within a relatively small space. In this regard, the base unit panels 128 are preferably dimensioned such that the partially disassembled and foled hoist 26 can be placed in and contained by the central well region 132 which extends longitudinally along the mid region of the cargo ramp 18 (depicted in FIG. 1 and fully described within the referenced U.S. Pat. No. 4,039,163).

It will be recognized by those skilled in the art that the embodiment depicted herein is exemplary in nature and the many variations therein can be practiced without departing from the scope and spirit of this invention. For example, as is depicted in FIG. 6, it may be advantageous in certain situations to include an additional pulley assembly 134 that is mounted to the central region of the base unit 30 at a position aft of the ball screw 108 to route the cable 82 substantially parallel to the cargo compartment floor 20. Additionally, and as is further depicted in FIG. 6, it may be desirable to include outwardly extending flanges 136 near the apex of the A-frame assembly 94 to permit the cable harness 70 to be pinned to or otherwise retained during the portions of the operational sequence in which the ball screw 106 is utilized to swing the cargo ramp upper end 72 through the cargo opening 14. Directly connecting the cable harness 70 to the A-frame 94 during such portions of the operative sequence of the hoist 26 transfers the weight of the cargo ramp 18 to the A-frame 94 and can thereby eliminate the need for operating the cargo system winch 28 as the cargo ramp upper end 72 is swung through the cargo opening 14.

The embodiments of the invention in which an exclusive property or privilege is claimed are defined as follows:

1. A portable cargo ramp hoist for mounting within an aircraft to facilitate the installation and removal of an elongate cargo ramp that is positioned to extend between the sill region of a cargo opening and the surface of the ground to provide an inclined plane over which cargo can be moved between ground level and the floor of the aircraft cargo compartment, said cargo ramp hoist comprising:

base means positionable inside said aircraft on said cargo compartment floor proximate to said sill region of said cargo opening, said base means including restraint means for removably affixing said base means to said aircraft;

elongate arm means having the first end thereof pivotably attached to said base means for swinging the second end of said elongate arm means inwardly and outwardly through said cargo opening; said second end of said elongate arm means including cable guide means;

actuator means interconnected between said base means and said elongate arm means, said actuator means being operable for swinging said elongate arm means between a first position in which said second end of said elongate arm means is located inside of said cargo compartment and above said cargo compartment floor and a second position in which said second end of said elongate arm means is located outside of said cargo compartment and above said sill region of said cargo opening; and, cable harness means having a first end adapted for removable interconnection with the upper end of said cargo ramp, said cable harness means being routable through said cable guide means of said elongate arm means.

2. The portable cargo ramp hoist of claim 1 wherein said elongate arm means comprises an A-frame having the lower region of each of the angularly extending legs thereof pivotably attached to said base means and wherein said cable guide means comprises a cable sheave mounted for rotation at the apex of said A-frame.

3. The portable cargo ramp hoist of claim 1 wherein said aircraft is of the type including a plurality of sill fittings mounted outside of said cargo compartment and below said sill region of said cargo opening, said aircraft further including a plurality of end locks positioned in said cargo compartment floor and extendable to project upwardly therefrom, and wherein said portable cargo ramp hoist base means is substantially rectangular in geometry and is dimensioned to extend inwardly into said cargo compartment from said sill region of said cargo opening to a plurality of spaced apart ones of said end locks, said restraint means comprising a plurality of aft restraint means pivotably mounted to said base means at locations which place each of said aft restraint means adjacent to one of said end locks when said rectangular base means is positioned at said sill region of said cargo opening, each of said aft restraint means including pivotably mounted strap means swingable to encompass the end lock that is adjacent each particular aft restraint means when said rectangular base means is positioned at said sill region of said cargo opening, said restraint means further comprising a plurality of forward restraint means mounted to said base means at locations which place each of said forward restraint means directly above one of said aircraft sill fittings when said rectangular base means is positioned at said sill region of said cargo opening, each of said forward restraint means including flexible strap means extendable between said rectangular base means and the aircraft sill fitting that is below each particular forward restraint means when said rectangular base means is positioned at said sill region of said cargo opening, each of said flexible straps including a terminus adapted for engaging one of said aircraft sill fittings, each of said forward restraint means further including strap tightener means operative to anchor said cargo ramp hoist to said aircraft when said rectangular base means is positioned at said sill region of said cargo opening and said aft and forward restraint means are respectively engaged with said end locks and said sill fittings.

4. The cargo ramp hoist of claim 3 further comprising first indexing means mounted to said cargo compartment floor at a position proximate said sill region of said cargo opening, said rectangular base means further including second indexing means mounted to project downwardly from said base means for engagement with said first indexing means when said rectangular base means is positioned to extend inwardly into said cargo compartment from said sill region of said cargo opening to said plurality of spaced apart end locks.

5. The portable cargo ramp hoist of claim 3 wherein said rectangular base means comprises a plurality of substantially rectangular panels and a plurality of hinges mounted to serially interconnect said plurality of substantially rectangular panels, said rectangular base means being foldable about said hinges for stowage of said cargo ramp hoist during periods of nonuse when said cargo ramp hoist is not mounted within said aircraft.

6. The portable cargo ramp hoist of claim 5 wherein said plurality of substantially rectangular panels includes three panels serially interconnected by said plurality of hinges so that the two outermost panels can be swung upwardly for stowage of said cargo ramp hoist, and wherein said elongate arm means comprises an A-frame assembly first and second legs extending angularly downward from the apex of said A-frame, said outermost rectangular panels of said base means each including attachment means for pivotably attaching the lower region of said first and second legs to said base means, said attachment means including means for disconnecting said A-frame from said base means for placement of said A-frame on the central one of said three rectangular panels for storage of said A-frame when said outmost panels are swung upwardly for stowage of said cargo ramp hoist.

7. The portable cargo ramp hoist of claim 3 wherein said aircraft is equipped with a winch that is mountable within said cargo compartment, and wherein said first end of said cable harness includes an elongate beam member having each end thereof adapted for interconnection with the upper end of said cargo ramp, said cable harness further including first, second and third cables, the first end of each of said first, second and third cables being interconnected with one another to define a Y-shaped cable configuration, the second end of said first and second cables being attached to said elongate beam member at spaced apart positions that are substantially equidistant from the center thereof, the second end of said third cable being adapted for connection with said winch of said aircraft with said third cable being routed through said cable guide means.

* * * * *

UNITED STATES PATENT AND TRADEMARK OFFICE
CERTIFICATE OF CORRECTION

PATENT NO. : 4,186,901
DATED : February 5, 1980
INVENTOR(S) : Thomas H. Shorey

It is certified that error appears in the above-identified patent and that said Letters Patent are hereby corrected as shown below:

Column 5, line 52: "extent" is changed to --extend--.

Column 9, line 15: "foled" is changed to --folded--.

Column 11, line 16: "assembly first" is changed to --assembly having first--.

Signed and Sealed this

Twenty-fourth Day of June 1980

[SEAL]

Attest:

SIDNEY A. DIAMOND

Attesting Officer    Commissioner of Patents and Trademarks